United States Patent
Piesco et al.

(10) Patent No.: US 7,281,270 B2
(45) Date of Patent: Oct. 9, 2007

(54) ATTACK IMPACT PREDICTION SYSTEM

(75) Inventors: Albert L. Piesco, Sterling, VA (US); Julia H. Walsh, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 920 days.

(21) Appl. No.: 10/404,848

(22) Filed: Apr. 1, 2003

(65) Prior Publication Data

US 2006/0010493 A1    Jan. 12, 2006

(51) Int. Cl.
*G06F 11/00* (2006.01)
(52) U.S. Cl. .......................................... 726/25; 726/22
(58) Field of Classification Search ................ 726/25, 726/22
See application file for complete search history.

(56) References Cited

U.S. PATENT DOCUMENTS

| | | | |
|---|---|---|---|
| 5,621,889 A | 4/1997 | Lermuzeaux et al. | |
| 6,088,804 A | 7/2000 | Hill et al. | |
| 6,134,664 A | 10/2000 | Walker | |
| 6,185,689 B1 | 2/2001 | Todd, Sr. et al. | |
| 6,275,942 B1 | 8/2001 | Bernhard et al. | |
| 6,279,113 B1 | 8/2001 | Vaidya | |
| 6,281,790 B1 | 8/2001 | Kimmel et al. | |
| 6,282,546 B1 | 8/2001 | Gleichauf et al. | |
| 6,298,445 B1 | 10/2001 | Shostack et al. | |
| 6,301,668 B1 | 10/2001 | Gleichauf et al. | |
| 6,363,489 B1 | 3/2002 | Comay et al. | |
| 6,370,648 B1 | 4/2002 | Diep | |
| 6,374,358 B1 * | 4/2002 | Townsend | 726/1 |
| 6,393,386 B1 | 5/2002 | Zager et al. | |
| 6,408,391 B1 | 6/2002 | Huff et al. | |
| 6,742,128 B1 * | 5/2004 | Joiner | 726/25 |
| 7,043,759 B2 | 5/2006 | Kaashoek et al. | |
| 7,134,141 B2 | 11/2006 | Crosbie et al. | |
| 2002/0059528 A1 | 5/2002 | Dapp | |
| 2002/0066034 A1 | 5/2002 | Schlossberg et al. | |
| 2002/0066035 A1 | 5/2002 | Dapp | |

FOREIGN PATENT DOCUMENTS

| | | |
|---|---|---|
| EP | 0 985 995 A1 | 3/2000 |
| WO | WO 99/57625 A1 | 11/1999 |
| WO | WO 01/39379 A2 | 5/2001 |
| WO | WO 01/71499 A1 | 9/2001 |
| WO | WO 02/44871 A2 | 6/2002 |

\* cited by examiner

*Primary Examiner*—Kambiz Zand
*Assistant Examiner*—Jacob Lipman
(74) *Attorney, Agent, or Firm*—Oliff & Berridge, PLC

(57) ABSTRACT

An attack impact prediction system for providing network security for computer networks is disclosed. A computer network includes multiple attack impact prediction (AIP) agents. In response to a detection of an intrusion to a computer network, an AIP agent is notified of the intrusion. In turn, the AIP agent broadcasts the detected intrusion to other AIP agents within the computer network. An impact of the detected intrusion is then determined at each node by its respective AIP agent. In response to a determination that an impact of the detected intrusion on a node exceeds a predetermined severity threshold, then actions need to be taken by each respective AIP agent is ascertained. Finally, the ascertained actions are performed by one or more AIP agents at various points within the computer network.

17 Claims, 3 Drawing Sheets

ATTACK IMPACT PREDICTION SYSTEM

BACKGROUND OF THE INVENTION

The present invention was made under government contract MIDA904-99-G-0017 with the United States Defense Logistics Agency.

1. Technical Field

The present invention relates to computer network security in general, and in particular to a method and system for providing security to computer networks. Still more particularly, the present invention relates to a method for predicting the impact of an attack on a computer network and taking protective actions to mitigate the impact.

2. Description of the Related Art

The number of attacks on computer networks has been on the rise in recent years. With a better understanding of the inner workings of computer networks, network intruders have become very skillful in taking advantages of the weaknesses of computer networks to obtain unauthorized accesses. Often, network intruders can easily overcome a password authentication mechanism designed to protect a computer network. Network intruders also use patterns of intrusion that are often difficult to trace and identify. They use several levels of indirection before breaking into target systems and rarely indulge in sudden bursts of suspicious or anomalous activity. After compromising an account on a target system, network intruders typically cover their tracks as not to arouse suspicion.

As the number of users within an entity grows, the risks from unauthorized intrusions into a computer network within the entity also increases. In order to maintain a reliable and secure computer network, exposure to potential network intrusions must be reduced as much as possible. Network intrusions can originate either from legitimate users within an entity attempting to access secure portions of the computer network or from illegitimate users outside the entity attempting to break into the computer network. Intrusions from any one of the above-mentioned two groups can compromise the security of the computer network.

One shortcoming of today's intrusion detection systems is that once an intrusion is detected, the response is usually "fixed." The conventional responses to detected network intrusions have been to contact a system administrator via electronic mail, telephone or pager, or simply log the detected intrusion into a log file for later analysis. These intrusion detection systems are inflexible and do not provide for a real-time response to a network intrusion of an organization's computer network. They also do not attempt to counter or fix the problems arising from the detected network intrusion. Further, they do not provide a flexible upgrade path to take advantage of new technologies, or to adopt to evolving needs of the computer user.

Consequently, it would be desirable to provide an improved method and system for providing network security for computer networks. The improved method and system should respond to computer network intrusions automatically. The improved method and system should provide a true real-time response to a detected network intrusion instead of simply a notification.

SUMMARY OF THE INVENTION

In accordance with a preferred embodiment of the present invention, a computer network includes multiple attack impact prediction (AIP) agents. In response to a detection of an intrusion to a computer network, an AIP agent is notified of the intrusion. In turn, the AIP agent broadcasts the detected intrusion to other AIP agents within the computer network. An impact of the detected intrusion is then determined at each node by its respective AIP agent. In response to a determination that an impact of the detected intrusion on a node exceeds a predetermined severity threshold, then actions need to be taken by each respective AIP agent is ascertained. Finally, the ascertained actions are performed by one or more AIP agents at various points within the computer network.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
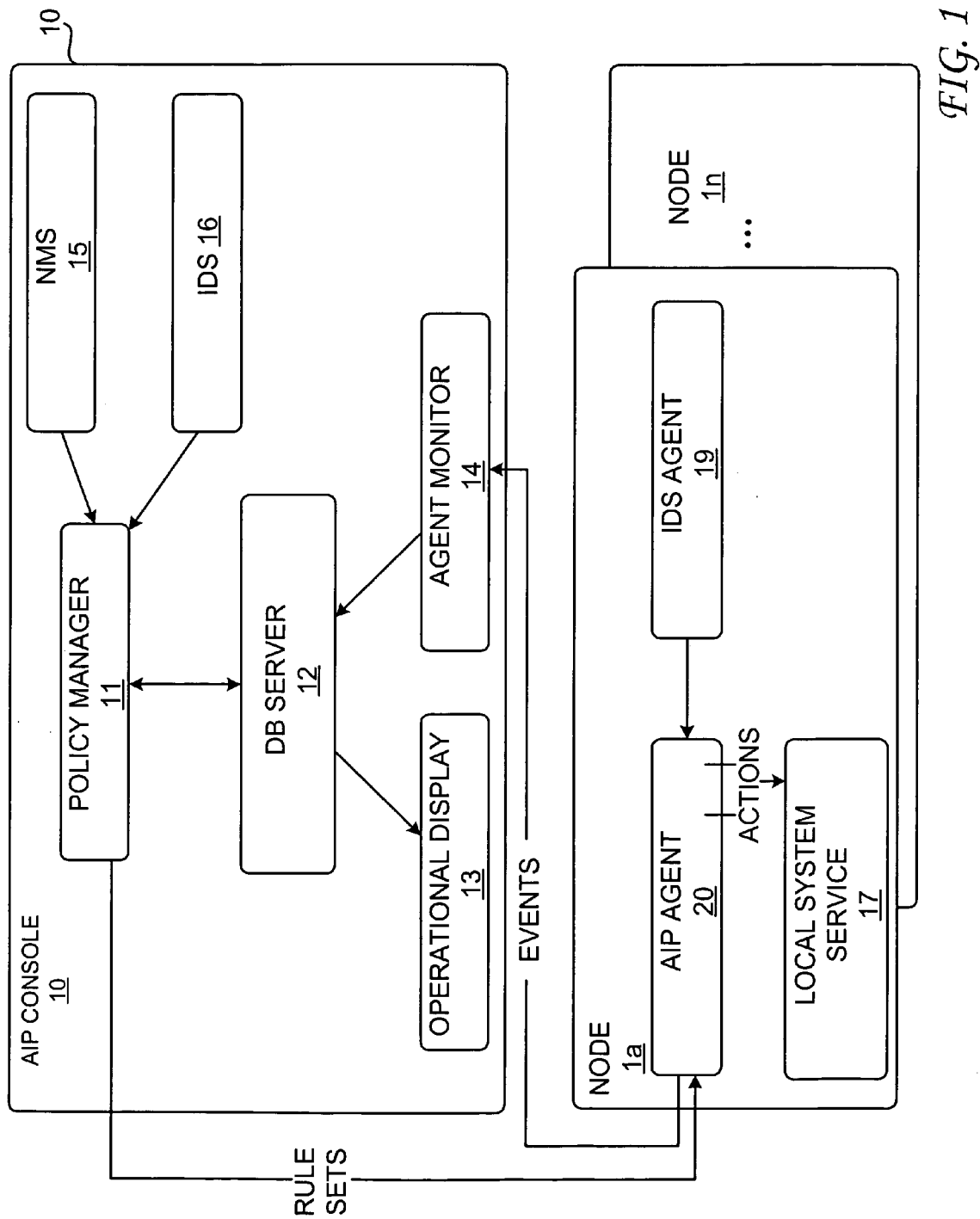
FIG. 1 is a block diagram of a computer network having an attack impact prediction system, in accordance with a preferred embodiment of the present invention.

Referring now to the drawings and in particular to FIG. 1, there is depicted a block diagram of a computer network having an attack impact prediction (AIP) system, in accordance with a preferred embodiment of the present invention. As shown, an AIP console 10 is coupled to multiple network computer nodes 1a-1n. AIP console 10 includes a policy manager 11, a database server 12, an AIP operational display 13, and an agent monitor 14. Information can be input to policy manager 11 via a network management system (NMS) 15 and an intrusion detection system (IDS) 16. In response to a detected attack on one of computer nodes 1a-1n, AIP operational display 13 provides a view of the detected attack, the severity of damage that can be inflicted by the detected attack, and the corresponding protective actions taken against the detected attack. A graphical network topology can be used to illustrate where and what the detected attack is taking place within the computer network, where and what protective actions are being taken to handle the detected attack within the computer network, and what the impact of the detected attack will be on the computer network. In addition, AIP operational display 13 also shows the computer network's current INFOCON level. INFOCON level is an indicator of escalating attack activity and severity on a computer network to be described later in details.

Each of computer nodes 1a-1n preferably includes an AIP agent, one or more local system services, and an IDS agent. For example, computer node 1a includes an AIP agent 20, a local system service module 17, and an IDS agent 19. After an attack has been detected, IDS agent 19 alerts AIP agent 20 of the detected attack. In addition, information about the detected attack is shared among all AIP agents (not shown) in other computer nodes 1b-1n so that protective actions may be taken throughout the entire computer network, including any external network devices.

An AIP agent, such as AIP agent 20, tracks the security state of a computer using the concept of INFOCON levels. In addition to providing users with more information about the security state of a computer network, the primary reason for using INFOCON levels is to lay the framework for additional protective action responses. Preferably, five INFOCON levels being utilized to reflect the changes in the severity and/or frequency of attacks on a computer network. The five INFOCON levels are defined as follows.

I. Normal

INFOCON NORMAL indicates normal threat environment and precautions apply. For an AIP system, a NORMAL state indicates that attack frequency levels have not increased by more than 10% in the past 24 hours and no more than 10% of the detected attacks have a severity that exceeds a predefined severity threshold for a computer network.

II. Alpha

INFOCON ALPHA indicates a heightened threat of possible information attack where an increased number of problems may indicate patterned surveillance or reconnaissance.

An AIP system transitions from a NORMAL state to an ALPHA state when attack frequency increases by more than 10% (but less than 20%) in the past 24 hours and/or more than 10% (but less than 20%) of the detected attacks have a severity that exceeds a predefined severity threshold for a computer network. The types of actions that an AIP agent should perform during the transition to the ALPHA state include:

close maintenance ports on routers, firewalls, and servers;
ensure the intrusion detection system in use is configured to have all attack signature checks turned on to respond to all attack signatures; and
manually execute virus scan on all systems within the computer network, and automate future iterations if possible.

III. Bravo

INFOCON BRAVO indicates a demonstrated, increased, and patterned set of intrusion activities exists that includes a compromise of systems resources. Examples of such intrusion activities include dedicated computer scans or probes and a significant increase of detected viruses, nuisances, pinging, and spamming.

An AIP system transitions from an ALPHA state to a BRAVO state when attack frequency increases by more than 20% (but less than 30%) in the past 24 hours and/or more than 20% (but less than 30%) of attacks detected have a severity that exceeds a predefined severity threshold for a computer network. The types of actions that an AIP agent should perform during the transition to the BRAVO state include:

harden firewall rules and router ACLs to deny unnecessary access from external sources;
configure system to change all passwords weekly;
run a password cracker (e.g., lopht, CRACK, John the Ripper) up against password file or SAM database for weak passwords; and
execute vulnerability scans (e.g., COPS,ISS system scan, nmap).

IV. Charlie

INFOCON CHARLIE indicates an actual information attack has occurred, or intelligence indicates an imminent information warfare attack. This includes the response to any collection efforts targeted against classified systems within a computer network.

An AIP system transitions from a BRAVO state to a CHARLIE state when attack frequency increases by more than 30% (but less than 40%) in the past 24 hours and/or more than 30% (but less than 40%) of attacks detected have a severity that exceeds a predefined severity threshold for a computer network. The types of actions that an AIP agent should perform during the transition to the CHARLIE state include:

upgrade security of workstations to disallow cookies, etc.;
disconnect web server; and
disable all "non-essential" accounts and/or restrict "su" capability.

V. Delta

INFOCON DELTA indicates the severity of an information attack has significantly degraded mission capability. Primary efforts at INFOCON DELTA are recovery and reconstitution.

An AIP system transitions from a CHARLIE state to a DELTA state when attack frequency increases by more than 40% in the past 24 hours and/or more than 40% of attacks detected have a severity that exceeds a predefined severity threshold for a computer network. The types of actions that an AIP agent should perform during the transition to the DELTA state include:

disable all external ports.

Decisions as to how a detected attack should be mitigated are made by each individual AIP agent based on the information previously loaded into the local rule sets. The local rule sets provide an AIP agent with the information the AIP agent will need to act autonomously in the event of a detected attack. The local rule sets are generated and distributed to respective AIP agents in nodes 1a-1n by policy manager 11. Policy manager 11 generates rule sets using an embedded inference engine that combines subject matter expertise, network topology, and IDS tool configuration information.

Figure 2:
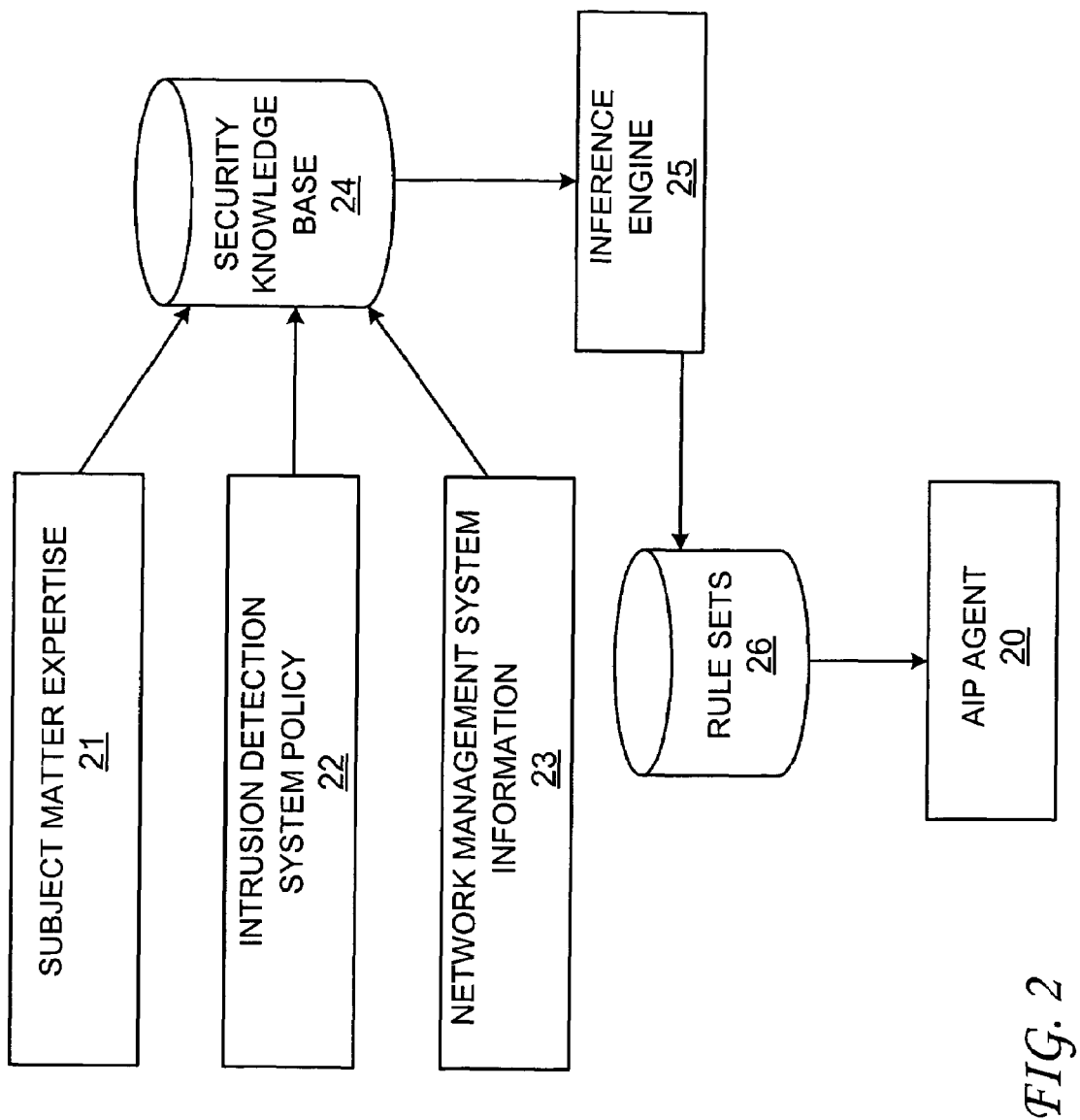
FIG. 2 is a high-level logic flow diagram of a method for building rule sets for an AIP agent, in accordance with a preferred embodiment of the present invention.

With reference now to FIG. 2, there is depicted a high-level logic flow diagram of a method for building rule sets for an AIP agent by policy manager 11, in accordance with a preferred embodiment of the present invention. Initially, a set of subject matter expertise 21, intrusion detection system policy 22 (from IDS 16 of FIG. 1), and network management system information 23 (from NMS 15 of FIG. 1) are input to a security knowledge base 24. Subject matter expertise 21 includes information such as attack types, network topology, known vulnerabilities for types of nodes, known attacks and type of damage caused, etc. Intrusion detection system policy 22 includes information such as attack signatures, etc. Network management system information 23 includes information such as network topology, types of nodes in the environment services, and users. Subsequently, rule sets 26 are compiled from security knowledge base 24 using an inference engine 25. Finally, rule sets 26 are provided to an AIP agent such as AIP agent 20 from FIG. 1.

Figure 3:
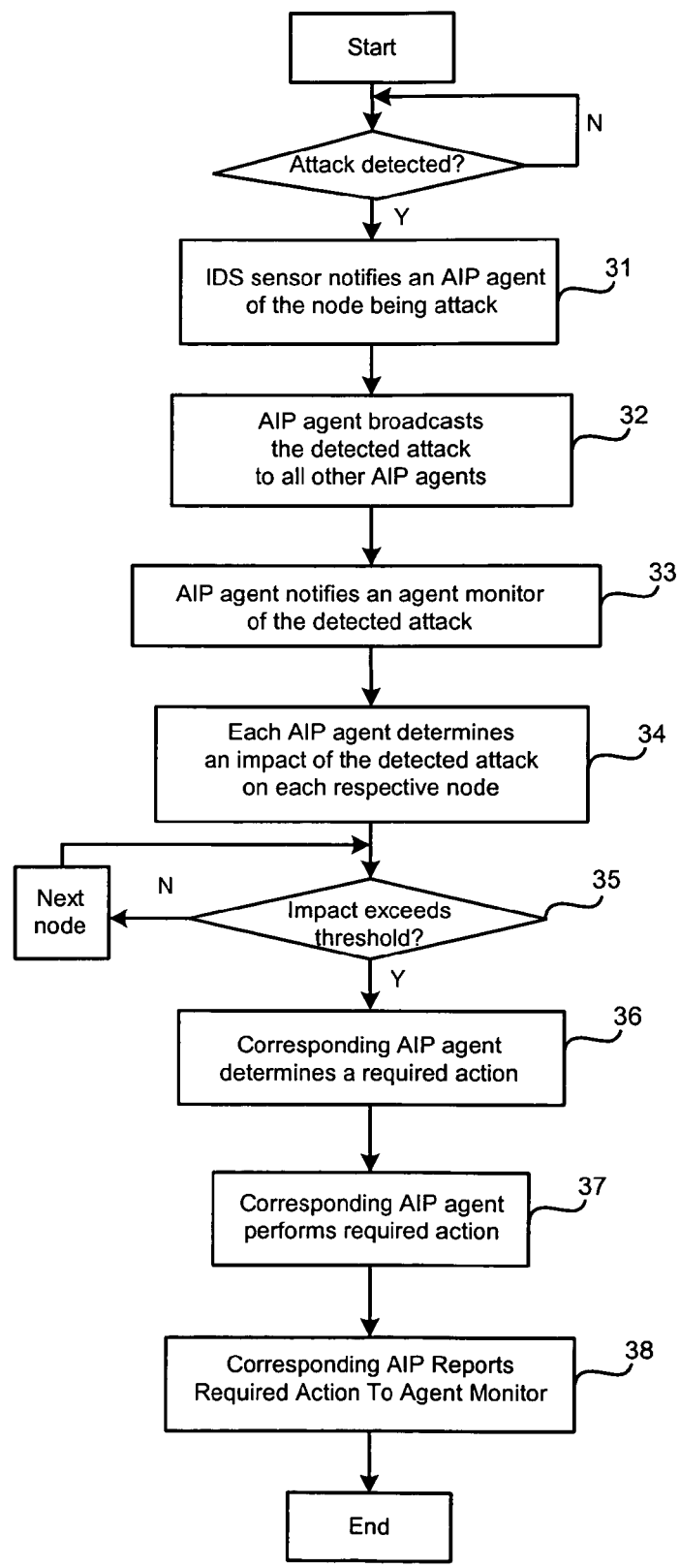
FIG. 3 is a high-level logic flow diagram of a method for providing network security for a computer network, in accordance with a preferred embodiment of the present invention.

Referring now to FIG. 3, there is illustrated a high-level logic flow diagram of a method for providing network security for a computer network, in accordance with a preferred embodiment of the present invention. After an attack to a computer network has been detected by an IDS sensor, the IDS sensor then notifies the AIP agent about the detected attack, as shown in block 31. The IDS sensor notifies the AIP agent about the type, source, and target of the detected attack. In turn, the AIP agent broadcasts the detected attack to all AIP agents located in the other nodes within the computer network, as depicted in block 32. The notification also includes the type, source, and target of the detected attack. In addition, the AIP agent also notifies an agent monitor of the AIP console about the detected attack, as shown in block 33, so that the detected attack can be displayed on an AIP operational display of the AIP console. Each AIP agent then determines an impact of the detected attack on each AIP agent's respective node and on each node for which the AIP agent is responsible, as depicted in block 34. On each node, a determination is made as to whether or not the impact of the detected attack exceeds a predetermined severity threshold, as shown in block 35. If the impact of the detected attack on a node exceeds a predetermined severity threshold, the corresponding AIP agent determines a required action that needs to be taken, as depicted in block 36. Subsequently, the corresponding AIP agent performs the required action, as shown in block 37. Finally, the corresponding AIP reports the required action to the agent monitor of the AIP console, as depicted in block 38.

A risk-level algorithm is used by an AIP agent to quantify the risk of a detected attack and to prioritize multiple detected attacks identified by an IDS. The risk-level algorithm includes a risk equation for calculating the severity of a detected attack on a computer network based on four factors: Criticality of Node under attack, the Lethality 11 of the attack, the Strength of System Countermeasures, and the Strength of Network Countermeasures. The risk equation, adapted from the SANS institute, can expressed as follows:

$$\text{Severity} = (\text{Criticality} + \text{Lethality}) - (\text{System Countermeasures} + \text{Network Countermeasures})$$

A Criticality score reflects the importance of a node and the services it provides to the organization's mission. A criticality score is assigned for each node during rule generation. The criticality score value is based on the type of node, number and value of the services supported, number of users supported, and importance of data maintained. As an example, node criticality could be ranked as follows:

Criticality by node (5 point scale)
   5—routing infrastructure, firewall, DNS server, core router
   4—server infrastructure, e-mail exchanger
   3—modems
   2—workstations
   1—personal computers Nodes with a large number of users and hosting critical services should have a higher score than nodes with few users and no critical services.

A Lethality score quantifies attack destructiveness and is based on the goal of the detected attack and how likely the detected attack is to succeed. For example, if the goal of the detected attack is to gain root access and if it can succeed, then the detected attack is an extremely lethal attack and should be assigned the highest value. If the detected attack has no apparent goal, it should be assigned the lowest value. As an example, attack lethality could be ranked as follows:

Lethality by attack (5 point scale)
   5—attack can gain root access across net
   4—denial of service lockout
   3—user access such as sniffed password
   2—confidentiality such as null session Lethality values are assigned by INFOSEC SMEs and maintained in the domain knowledge database component. Network administrators can adjust these values if they desire. As attacks are correlated with nodes that are susceptible to the attack during the rule building process, all lethality values will be based on a successful attack.

Each node is assigned a System Countermeasure strength score based on the security measures employed. For example, a node running the latest version of the operating system with current patches installed should be assigned with a high rating. However, if the operating system is an older version and allows users to execute remote shells, it should be assigned a much lower rating. Examples of countermeasure strength rating are as follows:

System Countermeasure strength (5 point scale)
   5—modern operating system with current patches, added security features such as TCP wrappers and secure shell
   4—modern operating system with current patches but the patches create new holes, factory default CGI scripts installed
   3—older operating system release, missing patches
   2—ability to remotely log in and run scripts
   1—no wrappers, fixed passwords allowed A System Countermeasure strength score is assigned for each node during rule generation.

A Network Countermeasure strength score quantifies the strength of the network security measures such as use of firewalls and IDS. If a fully tested and validated firewall and IDS are installed, then the highest value should be assigned for Network Countermeasure strength score. If an older firewall or improperly configured firewall is in place, the Network Countermeasure strength score should be much lower. The network countermeasure strength score can be assigned by a network administrator. Examples of countermeasure strength score assignments are as follows:

Network Countermeasure Strength (5 point scale)
   5—validated restrictive firewall, only one way in or out, and IDS
   4—validated restrictive firewall, only one way in or out, and no IDS
   3—restrictive firewall and some external connections such as dial-in or ISDN
   2—firewall with default installation configuration, and banks of modems
   1—permissive firewall not configured to block attacks An AIP agent uses the calculated Severity number based on the above-mentioned risk equation to determine whether the risk associated with a detected attack exceeds the comfort zone established for a computer network (i.e., a predetermined severity threshold). Such comfort zone can be established by a network administrator. The AIP agent will take appropriate actions based on the severity of the detected attack.

A network administrator can dynamically adjust the severity threshold to reflect the state of the frequency and nature of attacks. For example, if a computer network is under frequent attacks, then the severity threshold should be lowered. Based on the severity of a detected attack, decisions can be made about monitoring, slowing, or disabling services.

As has been described, the present invention provides a method for providing network security for computer networks. Under the present invention, an AIP system provides security administrators with information about what impact an attack will have on an environment and the missions it supports.

While the invention has been particularly shown and described with reference to a preferred embodiment, it will be understood by those skilled in the art that various changes in form and detail may be made therein without departing from the spirit and scope of the invention.

What is claimed is:

1. A method for providing network security for a computer network, said method comprising:
   in response to a detection of an intrusion to a computer network, notifying an attack impact prediction (AIP) agent of said detected intrusion;
   broadcasting said detected intrusion to other AIP agents within said computer network by said AIP agent;
   determining an impact of said detected intrusion at each node of said computer network by each node's respective AIP agent;
   in response to a determination that an impact of said detected intrusion on a node exceeds a predetermined severity threshold, ascertaining an action to be taken by an AIP agent associated with said node; and
   performing said ascertained action by said AIP agent associated with said node.

2. The method of claim 1, wherein the detection of an intrusion to a computer network is made in real-time.

3. The method of claim 1, wherein the detection of an intrusion to a computer network is determined at each node.

4. The method of claim 1, wherein said broadcasting further includes notifying an agent monitor of said intrusion by said AIP agent.

5. The method of claim 1, wherein said broadcasting further includes broadcasting a type, a source and a target of said intrusion to other AIP agents by said AIP agent.

6. The method of claim 1, wherein said determining further includes utilizing a risk equation to calculate a Severity value as follows:

$$\text{Severity} = (\text{Criticality} + \text{Lethality}) - (\text{System Countermeasures} + \text{Network Countermeasures}).$$

7. The method of claim 1, wherein said performing further includes reporting said determined action to an agent monitor by said agent associated with said node.

8. computer program product residing on a computer usable medium for providing network security for a computer network, said computer program product comprising:
   program code means for notifying an attack impact prediction (AIP) agent of said detected intrusion, in response to a detection of an intrusion to a computer network;
   program code means for broadcasting said detected intrusion to other AIP agents within said computer network by said AIP agent;
   program code means for determining an impact of said detected intrusion at each node of said computer network by each node's respective AIP agent;
   program code means for ascertaining an action to be taken by an AIP agent associated with said node, in response to a determination that an impact of said detected intrusion on a node exceeds a predetermined severity threshold; and
   program code means for performing said ascertained action by said AIP agent associated with said node.

9. The computer program product of claim 8, wherein said program code means for broadcasting further includes program code means for notifying an agent monitor of said intrusion by said AIP agent.

10. The computer program product of claim 8, wherein said program code means for broadcasting further includes program code means for broadcasting a type, a source and a target of said intrusion to other AIP agents by said AIP agent.

11. The computer program product of claim 6, wherein said program code means for determining further includes a risk equation for calculating a Severity value as follows:

$$\text{Severity} = (\text{Criticality} + \text{Lethality}) - (\text{System Countermeasures} + \text{Network Countermeasures}).$$

12. The computer program product of claim 8, wherein said program code means for performing further includes program code means for reporting said determined action to an agent monitor by said agent associated with said node.

13. A computer network having a network security, said computer system comprising:
   means for notifying an attack impact prediction (AIP) agent of said detected intrusion, in response to a detection of an intrusion to a computer network;
   means for broadcasting said detected intrusion to other AIP agents within said computer network by said AIP agent;
   means for determining an impact of said detected intrusion at each node of said computer network by each node's respective AIP agent;
   means for ascertaining an action to be taken by an AIP agent associated with said node, in response to a determination that an impact of said detected intrusion on a node exceeds a predetermined severity threshold; and
   means for performing said ascertained action by said AIP agent associated with said node.

14. The computer network of claim 13, wherein said means for determining further includes a risk equation for calculating a Severity value as follows:

$$\text{Severity} = (\text{Criticality} + \text{Lethality}) - (\text{Computer network Countermeasures} + \text{Network Countermeasures}).$$

15. The computer network of claim 13, wherein said means for performing further includes means for reporting said determined action to an agent monitor by said agent associated with said node.

16. The computer network of claim 13, wherein said means for broadcasting further includes program code means for notifying an agent monitor of said intrusion by said AIP agent.

17. The computer network of claim 16, wherein said means for broadcasting further includes means for broadcasting a type, a source and a target of said intrusion to other AIP agents by said AIP agent.

* * * * *